United States Patent [19]

Spencer et al.

[11] Patent Number: 5,562,891

[45] Date of Patent: Oct. 8, 1996

[54] METHOD FOR THE PRODUCTION OF CARBON DIOXIDE HYDRATES

[75] Inventors: Dwain F. Spencer, Half Moon Bay, Calif.; Wheeler J. North, Corona Del Mar, both of Calif.

[73] Assignees: The California Institute of Technology, Pasadena; Electric Power Research Institute, Palo Alto, both of Calif.

[21] Appl. No.: 291,593

[22] Filed: Aug. 16, 1994

Related U.S. Application Data

[63] Continuation-in-part of Ser. No. 956,520, Oct. 5, 1992, Pat. No. 5,397,553.

[51] Int. Cl.$^6$ ............................. F17C 5/02; F25J 1/00; C01B 31/20

[52] U.S. Cl. ................. 423/437 R; 423/220; 588/250; 62/53.1

[58] Field of Search ................. 423/220, 437 R; 588/250; 62/9, 53.1

[56] References Cited

U.S. PATENT DOCUMENTS

| | | | |
|---|---|---|---|
| 3,975,167 | 8/1976 | Nierman | 48/190 |
| 4,487,023 | 12/1984 | Hegadorn et al. | 62/1 |
| 4,883,423 | 11/1989 | Holowczenko | 431/328 |
| 4,930,319 | 6/1990 | Bee et al. | 62/69 |
| 5,044,164 | 9/1991 | Bee | 62/46.1 |
| 5,086,620 | 2/1992 | Spears | 62/51.1 |
| 5,107,006 | 4/1992 | Saito | 556/132 |
| 5,293,751 | 3/1994 | Asai | 62/53.1 |
| 5,304,356 | 4/1994 | Iijima et al. | 422/226 |
| 5,364,611 | 11/1994 | Iijima et al. | 423/437 R |
| 5,397,553 | 3/1995 | Spencer | 422/243 |

FOREIGN PATENT DOCUMENTS

| | | | |
|---|---|---|---|
| 0463663 | 1/1992 | European Pat. Off. | 588/250 |
| 3-164419 | 7/1991 | Japan . | |
| 4-11920 | 1/1992 | Japan . | |
| 4-55681 | 2/1992 | Japan | 62/53.1 |

*Primary Examiner*—Gary P. Straub
*Assistant Examiner*—Timothy C. Vanoy
*Attorney, Agent, or Firm*—Flehr, Hohbach, Test, Albritton & Herbert

[57] ABSTRACT

A method is provided for producing $CO_2$ hydrates. In the subject method, $CO_2$ is first dissolved in water to produce a $CO_2$ hydrate precursor. The $CO_2$ hydrate precursor is then mixed with $CO_2$ gas, resulting in hydrate production. Between the first and second steps, the $CO_2$ hydrate precursor may optionally be cooled to at least 0° C. and/or $CO_2$ hydrate nuclei may be introduced into the $CO_2$ hydrate precursor. The method is carried out in a continuous hydrate production reactor. The subject method finds use in sequestering $CO_2$ gas emissions in the form of hydrates, where the hydrates are deposited in high pressure, low temperature environments, such as in the ocean at depths greater than 1000 m or in subterranean fresh water aquifers.

12 Claims, 4 Drawing Sheets

METHOD FOR THE PRODUCTION OF CARBON DIOXIDE HYDRATES

CROSS-REFERENCE TO RELATED APPLICATIONS

This application is a continuation-in-part of U.S. application Ser. No. 07/956,520, filed Oct. 5, 1992, now U.S. Pat. No. 5,397,553 issued Mar. 14, 1995.

INTRODUCTION

1. Technical Field

The field of this invention is clathrate production.

2. Background

Clathrates are compounds comprising two types of molecules, where one type of molecule known as the guest molecule, occupies a cavity which is found in the crystal lattice structure of another type of molecule. In one specific type of clathrate known as a hydrate, the guest molecule occupies cavities in the crystal lattice structure of water. One particular type of hydrate which is of interest is the carbon dioxide ($CO_2$) hydrate. $CO_2$ hydrates are solid, ice like compositions which form from the following reaction between $CO_2$ and $H_2O$.

$$CO_2 + nH_2O \rightleftharpoons CO_2 \cdot nH_2O + \Delta H$$

where n=5.75

$$\Delta H = 60.9 kJ/mol \text{ (at 277K)}$$

Interest in $CO_2$ hydrates has increased as concern over $CO_2$ atmospheric emissions has intensified. Increasing levels of atmospheric $CO_2$ may produce rising global temperatures in what is known as the "greenhouse" effect. Thus, there is great interest in finding ways to reduce the rising levels of $CO_2$ in the atmosphere.

$CO_2$ hydrates provide a means for sequestering $CO_2$ because they can be deposited in environments where they remain stable or redissolve in water but have long residences times, where long residence time means periods in excess of 100, or even 1000, years. Examples of environments suitable for $CO_2$ sequestration include the ocean at depths greater than 1000 m or in subterranean aquifers. Thus, $CO_2$ which is incorporated into hydrates and then deposited in high pressure, low temperature environments may be considered sequestered.

$CO_2$ hydrates have been produced in a water "lattice" of 46 $H_2O$ molecules at pressures greater than 40 atmospheres and temperatures below 10° C. The 46 $H_2O$ molecule lattice structure comprises 2 small cavities and 6 large cavities, each of which may be occupied by a molecule of $CO_2$. Thus, the number of $CO_2$ molecules enclosed in this lattice may vary from 1 to 8 depending on the specific temperature and pressure conditions under which the hydrates are formed. Most data indicate that the number of $CO_2$ molecules trapped in the lattice depends primarily on the operating pressures, higher pressures increasing the number of molecules which become "trapped" in the ice lattice structure.

$CO_2$ hydrates of various levels of stability and volume fractions of crystals or granules have been produced with mole fractions of $CO_2$ varying from 0.05 to 0.17 in batch tests conducted at high pressure by admixing water with gaseous $CO_2$ at approximately 6° C. These hydrates have been produced with various levels of agitation provided by a glass rod which is enclosed in the reaction section. From the phase diagram for $CO_2$, water and hydrate, see FIG. 1, similar clathrate formation conditions exist for a sub-cooled mixture of $CO_2$ (gas) and water at pressures as low as 10 atmospheres, with temperatures of −1.5° C.

The packing density of $CO_2$ into the water matrix; i.e., the optimum $CO_2$ mole fraction fixed in the lattice, is important to the stability of the hydrate and the longevity of the sequestration of the $CO_2$. Higher packing density increases the specific gravity of the hydrates to levels greater than that of sea water; i.e., 1.1 gm/cc. Once these highly packed hydrates are formed and returned to the ocean at significant depth, they will sink by gravity toward the ocean floor.

Although several methods are known for producing $CO_2$ clathrates for the sequestration of $CO_2$ gas atmospheric emissions, these methods often require large amounts of energy to achieve hydrate formation conditions. Thus, there is continued interest in the development of new $CO_2$ hydrate production methods which require less energy and are therefor more economical than processes now in use. There is also interest in the development of new techniques that provide for greater control over the packing density of the $CO_2$ in the hydrate, where such processes would lead to hydrates having greater stability.

RELEVANT LITERATURE

Patents of interest include Japanese unexamined patent application 3-164419.

Other references of interest include: Nishikawa et al., "$CO_2$ Clathrate Formation and its Properties in the Simulated Deep Ocean," Energy Convers. Mgmt. (1992) 33:651–657; Saji et al., "Fixation of Carbon Dioxide by Clathrate-Hydrate," Energy Convers. Mgmt. (1992) 33: 643–649; Austvik & Loken, "Deposition of $CO_2$ on the Seabed in the Form of Hydrates," Energy Convers. Mgmt. (1992) 33: 659–666; Golumb et al., "The Fate of $CO_2$ Sequestered in the Deep Ocean," Energy Convers. Mgmt. (1992) 33: 675–683; Spencer, "A Preliminary Assessment of Carbon Dioxide Mitigation Options," Annu. Rev. Energy Environ. (1991) 16: 259–273.

SUMMARY OF THE INVENTION

Methods and apparatus are provided for producing $CO_2$ hydrates. In the subject method, pressurized, cooled $CO_2$, either liquid or gas, is dissolved in cool water ranging in temperature from 0° to 10° C. to produce a hydrate precursor. The hydrate precursor and $CO_2$ gas are then mixed, whereby $CO_2$ hydrates are produced. Between the first and second stages, the $CO_2$ hydrate precursor may optionally be cooled to −1.5 to 0° C. and/or injected with $CO_2$ hydrate nuclei, where these steps serve to enhance hydrate formation in the second stage. The method is carried out in a continuous hydrate production reactor. The subject method and apparatus find use in sequestering $CO_2$ gas emissions in the form of hydrates, where the hydrates are deposited in high pressure, low temperature environments, e.g. in the ocean at depths greater than 1000 m or in subterranean aquifers.

DESCRIPTION OF THE SPECIFIC EMBODIMENTS

Methods and apparatus are provided for the production of $CO_2$ hydrates using a continuous, two stage reaction process. The first stage of the subject two stage process comprises dissolving cooled, pressurized $CO_2$ in water to produce a hydrate precursor. In the second stage, the $CO_2$ hydrate precursor and $CO_2$ gas are combined with agitation, resulting in CO: hydrate production. In this second stage, the $CO_2$ may be introduced from one or two sources, where when two sources are employed $CO_2$ may be introduced in two distinct stages. The two stage hydrate production process is carried out in a continuous reactor. The subject invention finds use in processes for sequestering $CO_2$ gas atmospheric emissions in the form of hydrates, where the hydrates are deposited in high pressure, low temperature environments.

In the first stage of the subject method, $CO_2$ is dissolved in water to produce a $CO_2$ hydrate precursor. The $CO_2$ may be dissolved in water using any convenient means of combining the $CO_2$ with the water, such as bubbling a stream of $CO_2$ gas through the water, injection of $CO_2$ into the water under sufficient mixing or agitation to provide for homogeneous dispersion of the $CO_2$ throughout the water, and the like. The temperature of the $CO_2$ will be 0° to −30° C., more usually between about −10° and −20° C. The $CO_2$ source that is combined with the water in this first stage may be either liquid or gaseous. Where gaseous $CO_2$ is combined with water to make the hydrate precursor, the gaseous $CO_2$ will be pressurized, usually to pressures ranging between 10 and 20 atm, more usually between about 10 and 15 atm. The water in which the $CO_2$ is dissolved may be fresh water or salt water, e.g. sea water. The temperature of the water will be cool, usually ranging from −1.5° to 10° C., more usually ranging from −1.5° to 5° C., and typically from about −1.5° to 3° C. The water may be obtained from any convenient source, but will usually be obtained from a source where it exists at the temperature range of interest, e.g. from ocean depths of at least 500 m, more usually at least 700 m, and frequently from depths greater than 1000 m. As needed, the water obtained from the ocean depths of greater than 500 m may be chilled the desired temperature range, e.g. −1.5° to 3° C.

Figure 1:
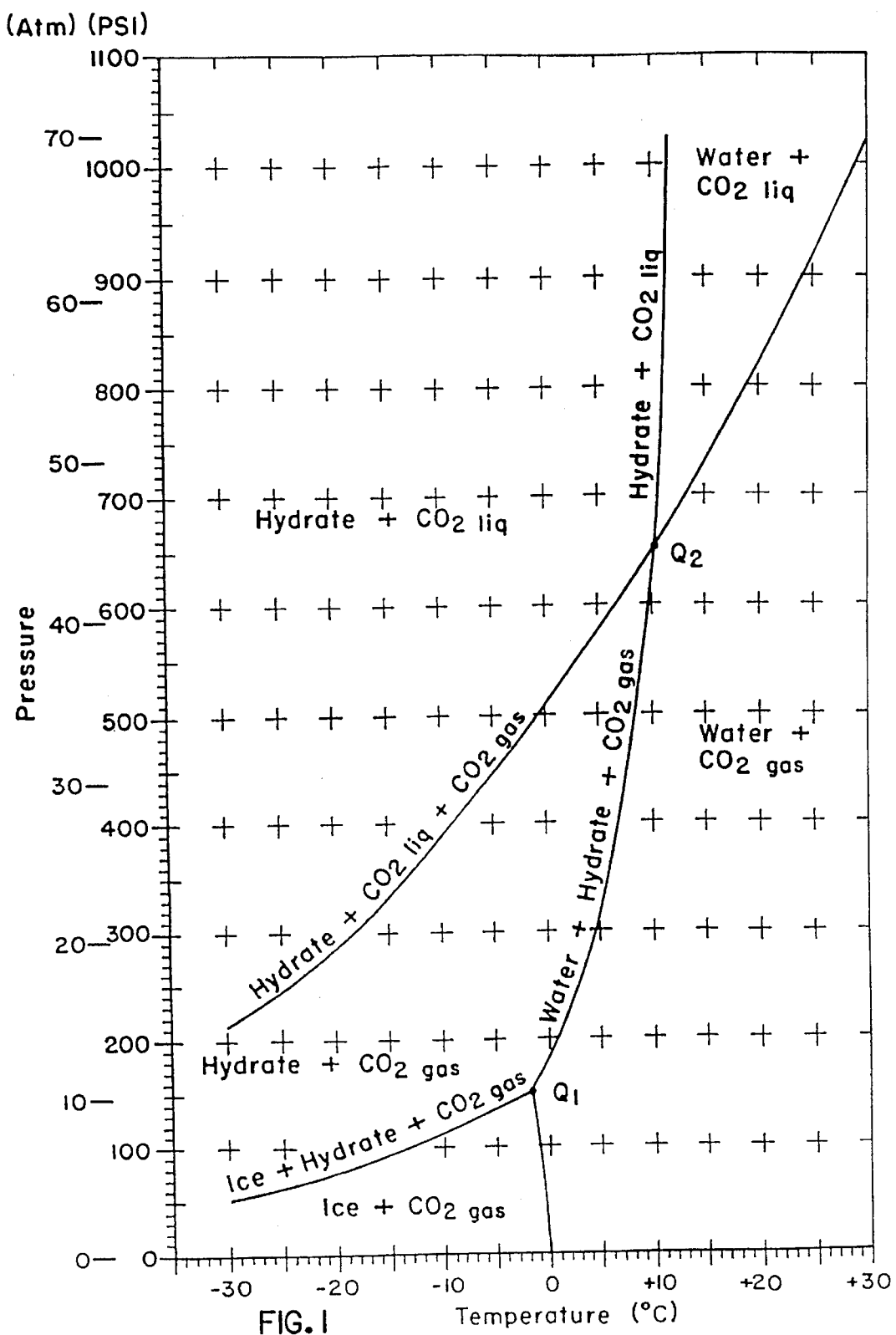
FIG. 1 is a phase diagram for $CO_2$, water and $CO_2$ hydrates.

The amount of $CO_2$ which is dissolved in the water in the first stage will be determined in view of the amount of $CO_2$ to be added to the hydrate precursor in the second sate. An upper limit to the amount of $CO_2$ that may be dissolved in the water in the first stage exists as above a certain mole fraction the $CO_2$ hydrate precursor is no longer liquid for a given temperature and pressure, see FIG. 1. This upper limit usually occurs at mole fractions of $CO_2$ in excess of 0.04. Thus, the amount of $CO_2$ which may be dissolved in the water in the first stage will be less than the amount required to reach this upper limit mole fraction of $CO_2$. Where desired, higher mole fractions of $CO_2$ in the hydrate precursor may be obtained for first forming hydrates in the precursor and then dissolving these hydrates by lowering the pressure and/or raising the temperature of the precursor.

The hydrate precursor is a flowable liquid comprising water and dissolved $CO_2$. It is theorized that the water molecules structure themselves around the $CO_2$ molecules in cage-like structures.

Following the first stage, but prior to the second stage of the subject hydrate production process, additional steps may be taken to enhance the production of hydrates in the second stage, i.e. hydrate production stage. First, one may cool the hydrate precursor to a temperature of at least −1.5° to 0° C. The temperature to which the hydrate precursor is cooled will depend on the nature of the water used for hydrate production. Thus, for the production of freshwater hydrates, the hydrate precursor may be cooled to about 0° C. Alternatively, for the production of salt water hydrates, the hydrate precursor may be cooled to −1.5° C. In addition, the hydrate precursor may be combined with $CO_2$ hydrate nuclei prior to the second stage. The hydrate precursor may be subjected to either or both of these additional steps to enhance the production of $CO_2$ hydrates in the second stage.

In the second stage of the two stage process i.e. the hydrate production stage, the $CO_2$ hydrate precursor and $CO_2$ gas are mixed by combining them with agitation, resulting in the formation of $CO_2$ hydrates. The $CO_2$ which is introduced into the hydrate production chamber in this second stage may be introduced from one source or two distinct sources in the hydrate production chamber. Using two distinct sources provides for the possibility of sequential introduction of $CO_2$ during the hydrate production stage. Where $CO_2$ is introduced sequentially, it is convenient to think of this second stage as comprising two stages, i.e. the addition of $CO_2$ is a two stage process. The temperature of the $CO_2$ gas may be the same as, or different from, the temperature of the $CO_2$ combined with the water in the first stage, and will typically range from 0° to −30° C., more usually from −10° to −20° C. The pressure of the $CO_2$ gas may also be the same as, or different from, the pressure of the $CO_2$ introduced in the first stage, but will usually range from 10 to 20 atm, more usually 10 to 15 atm. The $CO_2$ may preferably, though not necessarily, originate from the same source as that used in the hydrate precursor production stage. The pressure and temperature of the $CO_2$ may be chosen so as to obtain optimum packing of the $CO_2$ in the hydrate structure, thereby achieving hydrates with high mole fractions of $CO_2$.

Since the packing density of the hydrates produced in the second stage is dependent on the rotational orientation of the $CO_2$ molecules, methods which optimize the orientation of the $CO_2$ molecules may be employed. Methods of interest include sonic or infrared preconditioning of the $CO_2$ gas before it is combined with the hydrate precursor, and the like.

The mixing or agitation to which the $CO_2$ gas and hydrate precursor are subjected during the hydrate production step should be sufficiently vigorous so that the $CO_2$ is maximally dispersed throughout the hydrate precursor. Mixing of the $CO_2$ gas and hydrate precursor is accomplished using any convenient mixing or agitation means, such as bubbling $CO_2$ through the hydrate precursor, stirring means, injection means, and the like. The resulting $CO_2$ hydrates may be collected using any convenient means, such as mechanical scraping and depositing, and the like. In sequestering the hydrates, the hydrates may be deposited immediately using any convenient means, e.g. injecting the hydrates into a high temperature, low pressure reservoir as a water slurry which is then pumped into the ocean at depths greater than 500 m.

The subject two stage clathrate production method finds use in the sequestration of $CO_2$ gas emissions, such as the $CO_2$ emissions from fossil fuel combustion plants and the like. One $CO_2$ sequestration process in which the two stage hydrate production method may find use is the method disclosed in U.S. patent application Ser. No. 07/956,520 now U.S. Pat. No. 5,397,553, the disclosure of which is herein incorporated by reference. For purposes of completeness, the disclosed method of U.S. patent application Ser. No. 07/956,520 now U.S. Pat. No. 5,397,553 will be summarized. $CO_2$ gas originating from the burning of fossil fuels is compressed to pressures between 10 and 20 atm. This pressurized $CO_2$ is cooled to temperatures ranging between 0° and −30° C. This cooled, pressurized $CO_2$ gas is then sent to a clathrate production reactor where it is combined with water originating from a cool source. The cool water is typically pre-cooled to a temperature of about −1.5° to 0° C. The cooled, pressurized $CO_2$ and pre-cooled water are combined under hydrate forming conditions in a hydrate reactor, such as the two stage hydrate reactor of the subject invention. The resultant hydrates are then sequestered by depositing the hydrates in the ocean at depths greater than 500 m or in subterranean aquifers.

Figure 2:
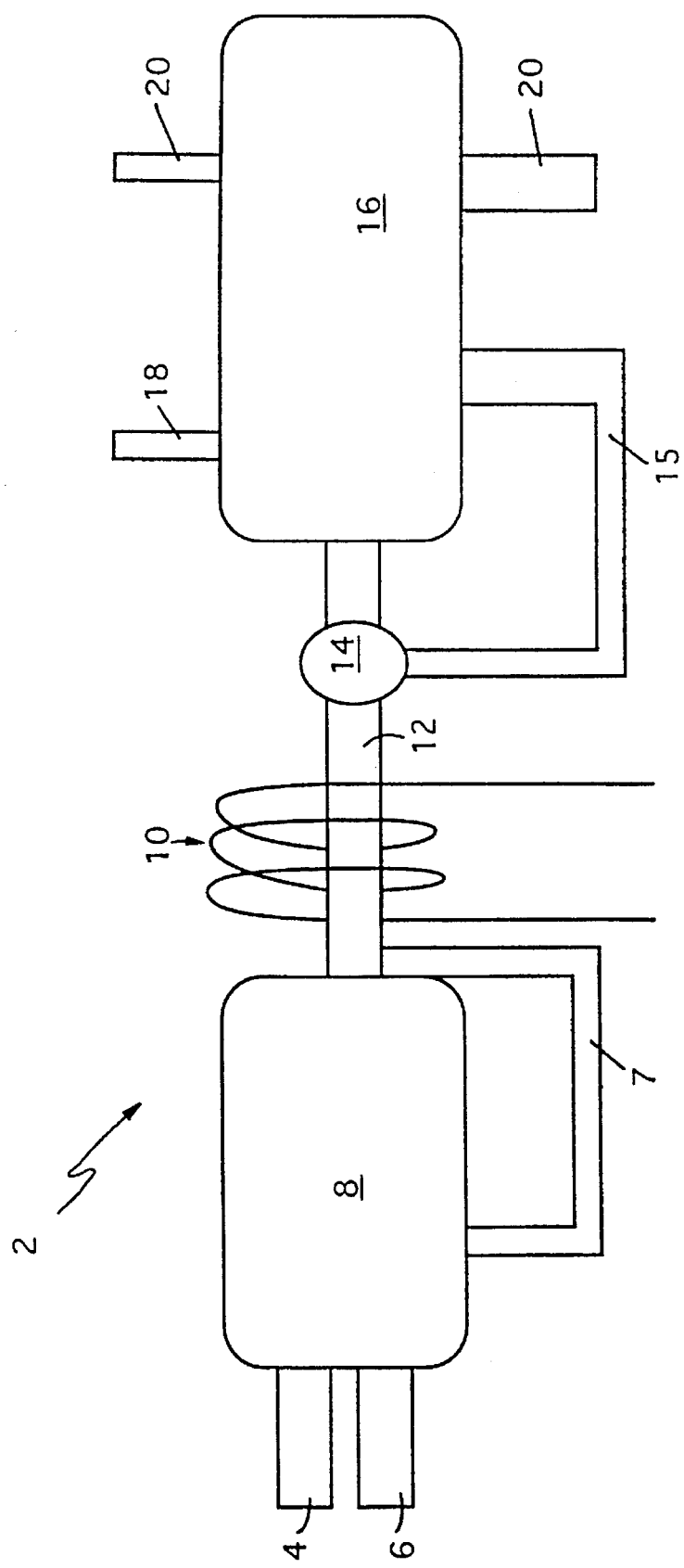
FIG. 2 is a schematic diagram for the subject hydrate production reactor.

The subject invention will now be discussed in greater detail in terms of the figures. Turning to FIG. 2, the hydrate reactor 2 has two main chambers: a $CO_2$ hydrate precursor production chamber 8 and a hydrate production chamber 16. In the $CO_2$ hydrate precursor production chamber, $CO_2$ from conduit 4 is dissolved in water from conduit 6 to produce hydrate precursor. The hydrate precursor production chamber is in fluid communication with the hydrate production chamber by conduit 12. A recycle conduit 7 may optionally be present for recycling precursor from to the hydrate precursor production chamber so that additional $CO_2$ may be introduced into the precursor, thereby raising the mole fraction of the $CO_2$ in the precursor. The hydrate precursor is then pumped to the hydrate production chamber 16. Prior to reaching the hydrate production chamber 16, the hydrate precursor is cooled to a temperature of −1° C. using refrigeration coils 10. The cooled hydrate recursor is then combined with $CO_2$ hydrate nuclei with hydrate nuclei injection means positioned at 14. A convenient way of introducing hydrate nuclei is to provide conduit 15, which provides for the introduction of water from the hydrate production chamber at injection means 14. In the hydrate production chamber 16, the hydrate precursor from conduit 12 enters the chamber and is combined with $CO_2$ gas from $CO_2$ conduit 18 and optional second conduit 20 with mixing using agitation means (not shown) to produce hydrates. The hydrates are collected using collection means not shown and may be removed through outlet 22.

Figure 3:
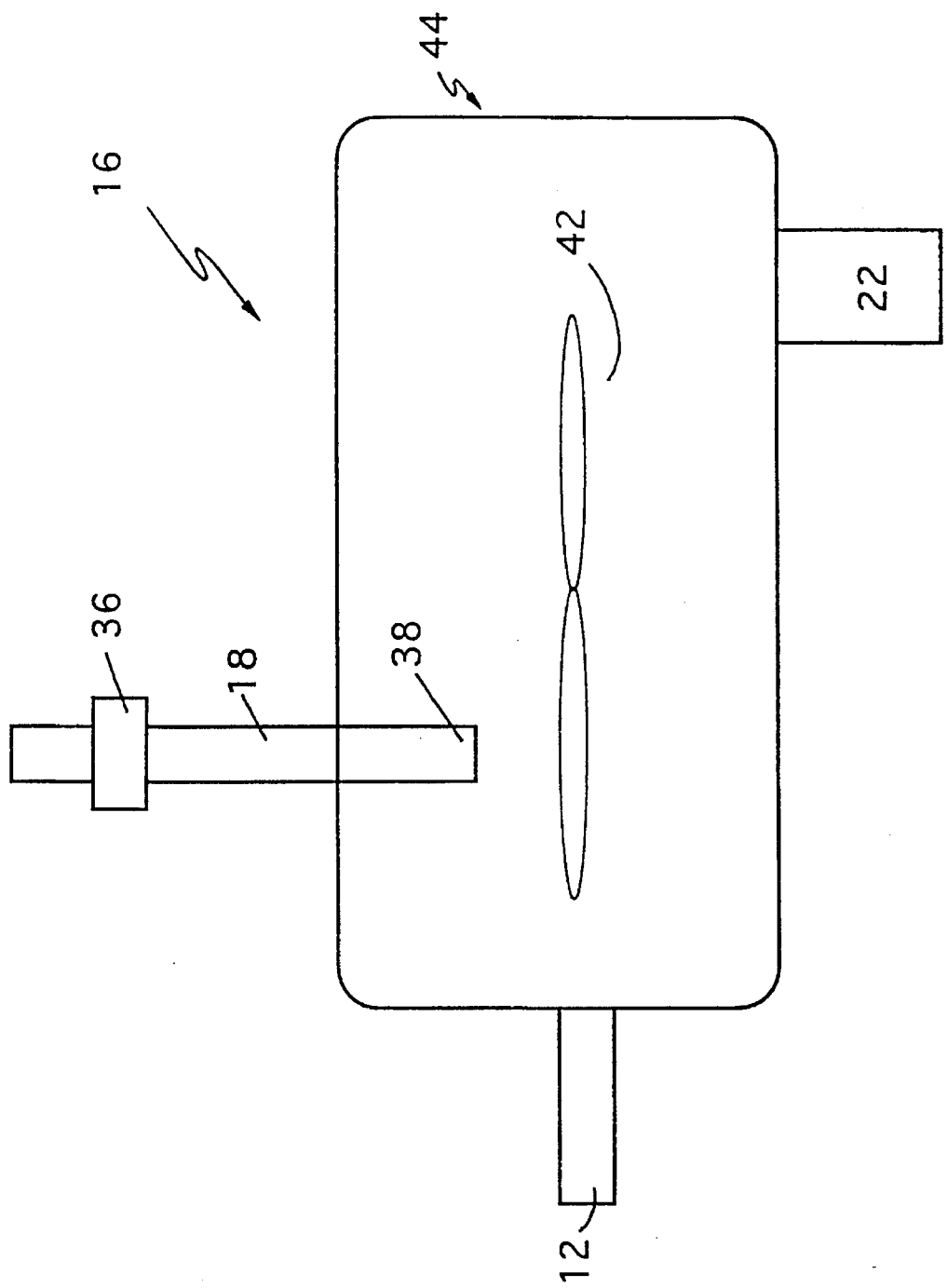
FIG. 3 is a schematic diagram for the hydrate production chamber of the subject hydrate production reactor shown in FIG. 2.

FIG. 3 provides a cross-sectional view of the hydrate production chamber 16 where the hydrates are produced. The hydrate production chamber 16 comprises a pressurized cylinder 44 which provides the necessary conditions for hydrate formation from the $CO_2$ and hydrate precursor. Although the reactor 16 is depicted as a cylinder, it is readily understood that its overall dimensions can take on other shapes such as a sphere or rectangular box. $CO_2$ is fed to the reactor 16 by pipe 18 which connects to diffuser 38 mounted internal to vessel 44. The $CO_2$ may be preconditioned in the sonicator 36. Diffuser 38 contains a plurality of holes (not shown) which serve to distribute the carbon dioxide gas evenly within the second unit 16. $CO_2$ hydrate precursor is brought to the reactor 16 by pipe 12. The hydrate precursor and $CO_2$ gas in the chamber may be mixed using agitation means 42. To further promote the formation of clathrates, the second chamber can be cooled by refrigeration unit (not shown). Cooling of second chamber 16 assists in maintaining a stable operating condition for continuous clathrate formation. The formed hydrates can be removed for sequestration by conduit 22. Although not shown, a second conduit for introduction of $CO_2$ into the hydrate production chamber may be included to provide for the possibility of a two stage introduction of $CO_2$ into the precursor in the hydrate production stage.

Figure 4:
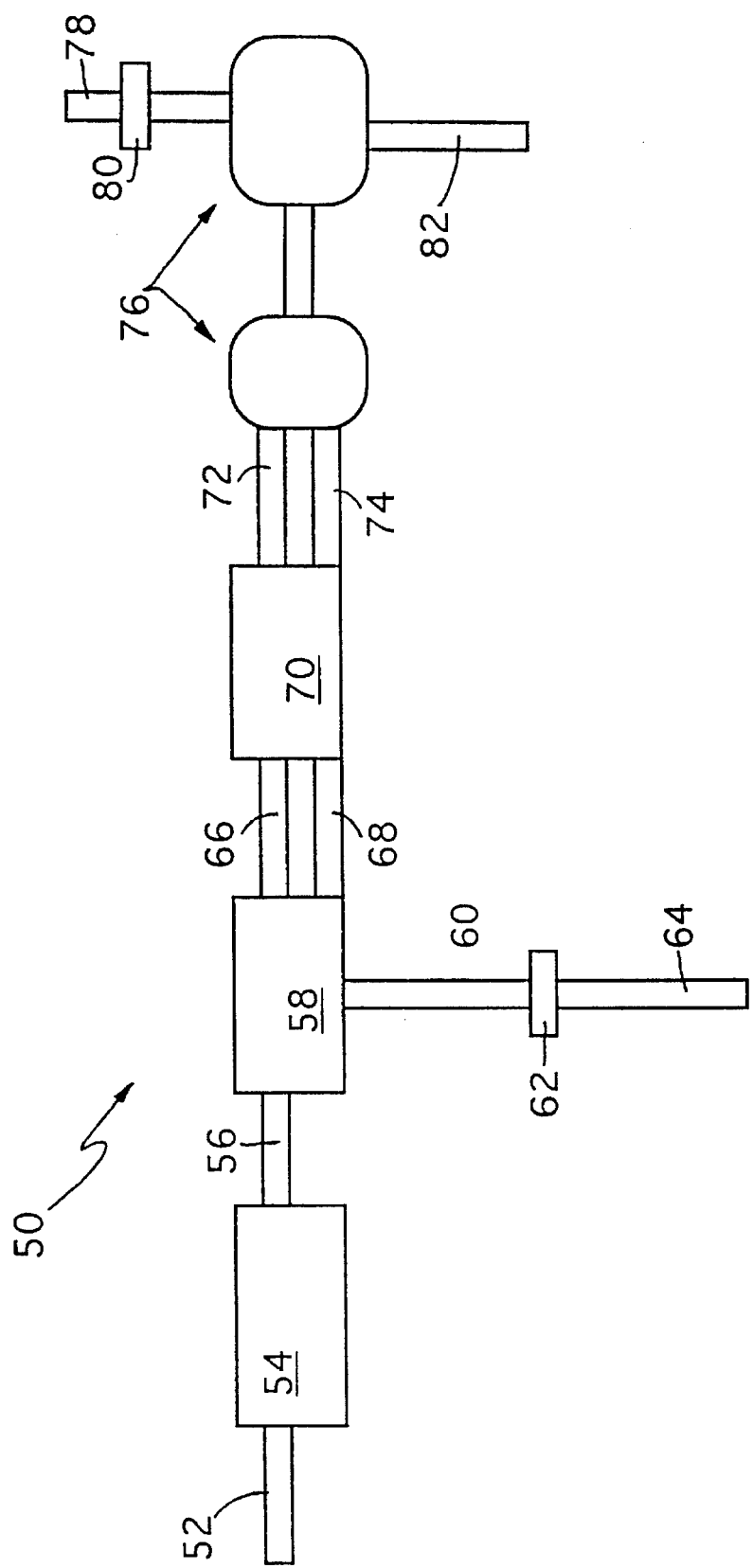
FIG. 4 is a schematic diagram for one type of $CO_2$ hydrate sequestration apparatus in which the subject hydrate production reactor may find use.

Referring now to FIG. 4, a schematic diagram 50 for a sequestration apparatus comprising the subject hydrate reactor is depicted. In the process, gaseous $CO_2$ produced from the combustion of fossil fuel in a power plant is fed to compressor 54 by conduit 52. Compressor 54 can be of any conventional design including positive displacement or centrifugal compressors capable of compressing the gas to pressures between 10 and 20 atmospheres. The compressed $CO_2$ gas is then routed to heat exchanger 58 by pipe 56. Heat exchanger 58 is of the conventional shell and tube, or plate type and receives cooling water from deep pipe 64. Deep pipe 64 draws suction from fresh or sea water from a depth of approximately 500 to 1000 meters, where the temperature of the water ranges from 0° to 10° C. Pump 62 delivers water from deep pipe 64 to heat exchanger 58 by connector pipe 60. Heat transfer from the compressed carbon dioxide to the sea water results in the $CO_2$ being cooled to approximately 10° C. In a parallel manner, pump 62 supplies water to the refrigeration unit 70.

The cooled $CO_2$ gas is fed to refrigeration unit 70 by connector pipe 66. Refrigeration unit 58 can be a typical vapor compression or adsorption type unit. The refrigeration unit cools both the compressed $CO_2$ and the sea water delivered to the refrigeration unit from the deep pipe 64 via conduit 68. The $CO_2$ gas temperature is reduced to between 0° C. and −30° C. by the refrigeration unit 70. At the same time, the temperature of the feed water is lowered to approximately −1.5° to 0° C.

Both the $CO_2$ gas and the feed water are routed to the continuous, two stage hydrate reactor 76 by conduits 72 and 74 respectively. The $CO_2$ feed source 78 which supplies $CO_2$ gas to the second chamber of the hydrate reactor may pass through an infrared or sonic conditioner 80 prior to entering the reactor. Hydrates produced in the two stage reactor are removed from the hydrate production chamber by conduit 82.

The $CO_2$ hydrates produced in the hydrate production chamber will either be released as solids into the ocean at a specified depth to ensure $CO_2$ sequestration or pumped as a 50:50 clathrate-water slurry, where the water in the slurry is the deep ocean water which has been upwelled to form the hydrates and acts as a carrier to return the hydrates or partially dissolved hydrates to ocean depths between 500 and 1000 meters.

The following examples are offered by way of illustration and not by way of limitation.

EXPERIMENTAL

In using the subject clathrate production method it was found that:

Stable $CO_2$ hydrates can by formed at pressures ranging from 10.9 to 13.6 atm at 0° C.

Introducing $CO_2$ hydrate nuclei into the water in during hydrate formation reduced the pressure required for hydrate formation by 1.36 to 8.16 atms, as compared to using hydrate nuclei free water at the same temperatures.

It is evident from the above description and exemplification that novel methods and apparatus are provided for the production of CO₂ hydrates. The subject two stage process provides for greater opportunity to control CO₂ and water temperatures and pressures at each stage of the process. Greater control over these parameters provides for better packing of $CO_2$ molecules in the $H_2O$ lattice structure and therefor increasing mole fractions of $CO_2$ in the resultant hydrates. The resultant hydrates are more stable, and the process results in less parasitic energy than previously utilized hydrate production methods.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for the production of $CO_2$ hydrates comprising:

dissolving a first stream of $CO_2$ in water, resulting in $CO_2$ hydrate precursor, wherein said $CO_2$ is at a temperature ranging from 0° to −30° C., and then mixing said $CO_2$ hydrate precursor and a second stream of $CO_2$ gas with agitation in a hydrate production step;

wherein $CO_2$ hydrates are produced.

2. The method according to claim 1, wherein said $CO_2$ hydrate precursor is cooled to at least 0° C. prior to said hydrate production step.

3. The method according to claim 1, wherein said $CO_2$ hydrate precursor is combined with $CO_2$ hydrate nuclei prior to said hydrate production step.

4. A method for the production of $CO_2$ hydrates from $CO_2$ and water, said method comprising:

dissolving a first stream of gaseous $CO_2$ in water, resulting in a $CO_2$ hydrate precursor, wherein said $CO_2$ is pressurized to a pressure ranging from 10 to 20 atm and cooled to a temperature ranging from 0° to −30° C., and said water has a temperature ranging from −1.5° to 0° C.; and then mixing said $CO_2$ hydrate precursor with a second stream of $CO_2$ gas with agitation in a hydrate production step, wherein said $CO_2$ gas is pressurized to a pressure ranging from 10 to 20 atm;

wherein $CO_2$ hydrates are produced.

5. The method according to claim 4, wherein said $CO_2$ hydrate precursor is cooled to at least 0° C. prior to said hydrate production step.

6. The method according to claim 4, wherein $CO_2$ hydrate nuclei is combined with said hydrate precursor prior to said hydrate production step.

7. The method according to claim 4, wherein said $CO_2$ gas is subjected to at least one of sonic and infrared preconditioning prior to said hydrate production step.

8. The method according to claim 4, wherein said $CO_2$ gas is sequentially introduced in said hydrate production step from two distinct $CO_2$ gas sources.

9. A method for sequestering $CO_2$ comprising:

compressing $CO_2$ gas to a pressure of 10 to 20 atmospheres;

cooling said compressed $CO_2$ to a temperature ranging from 0° to −30° C.;

cooling water to a temperature of about 0° C., said water being obtained from a source wherein said water is present at a temperature of less than about 10° C.;

dissolving a first stream of said cooled, pressurized $CO_2$ in said cooled water, resulting in a $CO_2$ hydrate precursor; and then mixing said $CO_2$ hydrate precursor with a second stream of cooled, pressurized $CO_2$ gas with agitation in a hydrate production step, resulting in $CO_2$ hydrate production; and depositing said hydrates in a high pressure, low temperature environment; wherein said $CO_2$ is sequestered.

10. The method according to claim 9, wherein said method further comprises the step of pre-cooling said compressed $CO_2$ by passing said compressed $CO_2$ through a heat exchanger cooled by water obtained from said source wherein said water is at temperature less than about 10° C.

11. A method according to claim 9, further comprising cooling said hydrate precursor to a temperature ranging from −1.5° to 0° C. prior to said hydrate production step.

12. A method according to claim 9, further comprising combining $CO_2$ hydrate nuclei with said hydrate precursor prior to said hydrate production step.

* * * * *